United States Patent [19]

Feinberg et al.

[11] Patent Number: 5,025,333

[45] Date of Patent: Jun. 18, 1991

[54] TAPE ENGAGEMENT MECHANISM FOR MAGNETIC CASSETTE TAPE

[75] Inventors: Howard A. Feinberg, San Jose; Theodore D. Rees, Mountain View, both of Calif.

[73] Assignee: R-Byte, Inc., San Jose, Calif.

[21] Appl. No.: 508,344

[22] Filed: Apr. 12, 1990

[51] Int. Cl.$^5$ .......................................... G11B 15/665
[52] U.S. Cl. ........................................ 360/85; 360/95
[58] Field of Search ............................ 360/85, 84, 95

[56] References Cited

U.S. PATENT DOCUMENTS

| 4,060,840 | 11/1977 | Umeda | 360/130 |
|---|---|---|---|
| 4,258,399 | 3/1981 | Iijima et al. | 360/85 |
| 4,410,919 | 10/1983 | Umeda | 360/85 |
| 4,459,625 | 7/1984 | Kawase | 360/95 X |

FOREIGN PATENT DOCUMENTS

| 55-125572 | 9/1980 | Japan | 360/85 |

*Primary Examiner*—John H. Wolff
*Attorney, Agent, or Firm*—Lyon & Lyon

[57] ABSTRACT

A mechanism for registering the tape contained within a cassette around a hellical-scan head drum mechanism includes means for sensing the presence of the tape cassette in a proper position for beginning the process of engagement of the tape in the cassette with the head assembly in the device. A symmetrical engagement mechanism includes two tape extraction roller blocks which sit at a first disengaged position. A tape extraction roller member for engaging the tape is mounted on each tape extraction roller block. When the presence of the casssette is sensed, the tape extraction roller blocks move along a predetermined path to a second, engaged position wherein the tape is correctly positioned around the head assembly. At a predetermined position along the path, a pair of symmetrically positioned entry-and-exit positioning rollers engage the tape and move it into position for passing it by the tape heads. Means are provided to properly position the tape in the X, Y, and Z planes at the second, engaged position of the tape extraction roller blocks. Means are provided to prevent jamming in the event that one tape extraction roller block arrives in its position prior to the other. In an embodiment where the device includes a helical-scan head drum assembly, stationary means are provided for correcting the position of the tape from the tilted plane of the helical-scan head drum assembly to the vertical plane. These means engage the tape prior to the end of travel of the tape extraction roller blocks. The tape is also loaded around a pinch roller and tension arm, as well as velocity and tension sensors.

25 Claims, 5 Drawing Sheets

TAPE ENGAGEMENT MECHANISM FOR MAGNETIC CASSETTE TAPE

BACKGROUND OF THE INVENTION

1. Field of the Invention

The present invention relates to magnetic tape drive equipment. More particularly, the present invention relates to apparatus for extracting the tape from the cassette and guiding it into engagement with the tape heads which are used to read the information from the tape.

2. The Prior Art

Mechanisms for inserting and ejecting magnetic tape cassettes from the devices in Which they are utilized exist in the prior art. While these mechanisms often provide for the manual insertion of the tape cassette into the device, all of such mechanisms known to the inventors utilize a motor drive for the purpose of assisting in the insertion and ejection of the tape cassette from the device once it has finished running. In such mechanisms, a power failure in the device makes the extraction of the cassette from the device difficult or impossible.

In addition, any mechanism for inserting and ejecting the cassettes must take into account the height of the tape drive hub spindles (approximately 0.30") used in the device to drive the tape reels contained within the cassettes, since the cassette must clear them when it is both inserted and ejected. The presence of the tape drive hub spindles also requires that the vertical motion of the cassette during insertion and ejection be free from any degree of lateral motion or tilt which would act to bind the cassette on the hub spindles and thus impede its motion.

Devices equipped with helical-scan heads include tape correction pins which are used to correct the orientation of the tape from the tilted plane caused by its engagement with the helical-scan head drum assembly to the vertical plane associated with the cassette. In such devices in the prior art which are known to the inventors, these pins are usually located within the tape puller roller blocks which are used to bring the tape into contact with the helical-scan head drum assembly. Because these pins are placed on the moveable tape puller roller blocks, they are more or less prone to misalignment caused by improper registration of the blocks with the drum assembly.

BRIEF DESCRIPTION OF THE INVENTION

According to a first aspect of the present invention, a mechanism for registering the tape contained within a cassette around a helical-scan head drum mechanism includes means for sensing the presence of the tape cassette in a proper position for beginning the process of engagement of the tape in the cassette with the head assembly in the device. A symmetrical engagement mechanism includes two tape extraction roller blocks which sit at a first disengaged position. A tape extraction roller member for engaging the tape is mounted on each tape extraction roller block. Means are provided to sense the presence of the tape cassette in a proper position for beginning the process of engagement of the tape in the cassette with the head assembly in the device. When the presence of the cassette is sensed, the tape extraction roller blocks move along a predetermined path to a second, engaged position wherein the tape is correctly positioned around the head assembly. At a predetermined position along the path, a pair of symmetrically positioned entry-and-exit positioning rollers engage the tape and move it into position for passing it by the tape heads. Means are provided to properly position the tape in the X, Y, and Z planes at the second, engaged position of the tape extraction roller blocks. Means are provided to prevent jamming in the event that one tape extraction roller block arrives in its position prior to the other. In an embodiment where the device includes a helical-scan head drum assembly, stationary means are provided for correcting the position of the tape from the tilted plane of the helical-scan head drum assembly to the vertical plane. These means engage the tape prior to the end of travel of the tape extraction roller blocks. The tape is also loaded around velocity and tension sensors.

DETAILED DESCRIPTION OF A PREFERRED EMBODIMENT

The present invention is particularly suited for use with digital audio tape (DAT) cassettes, but, as will be appreciated by those of ordinary skill in the art, the invention may be readily adapted for use with other types of magnetic tape cartridges and cassettes. Such persons will readily understand how to scale and modify the apparatus disclosed herein for use with other tape systems.

Figure 1:
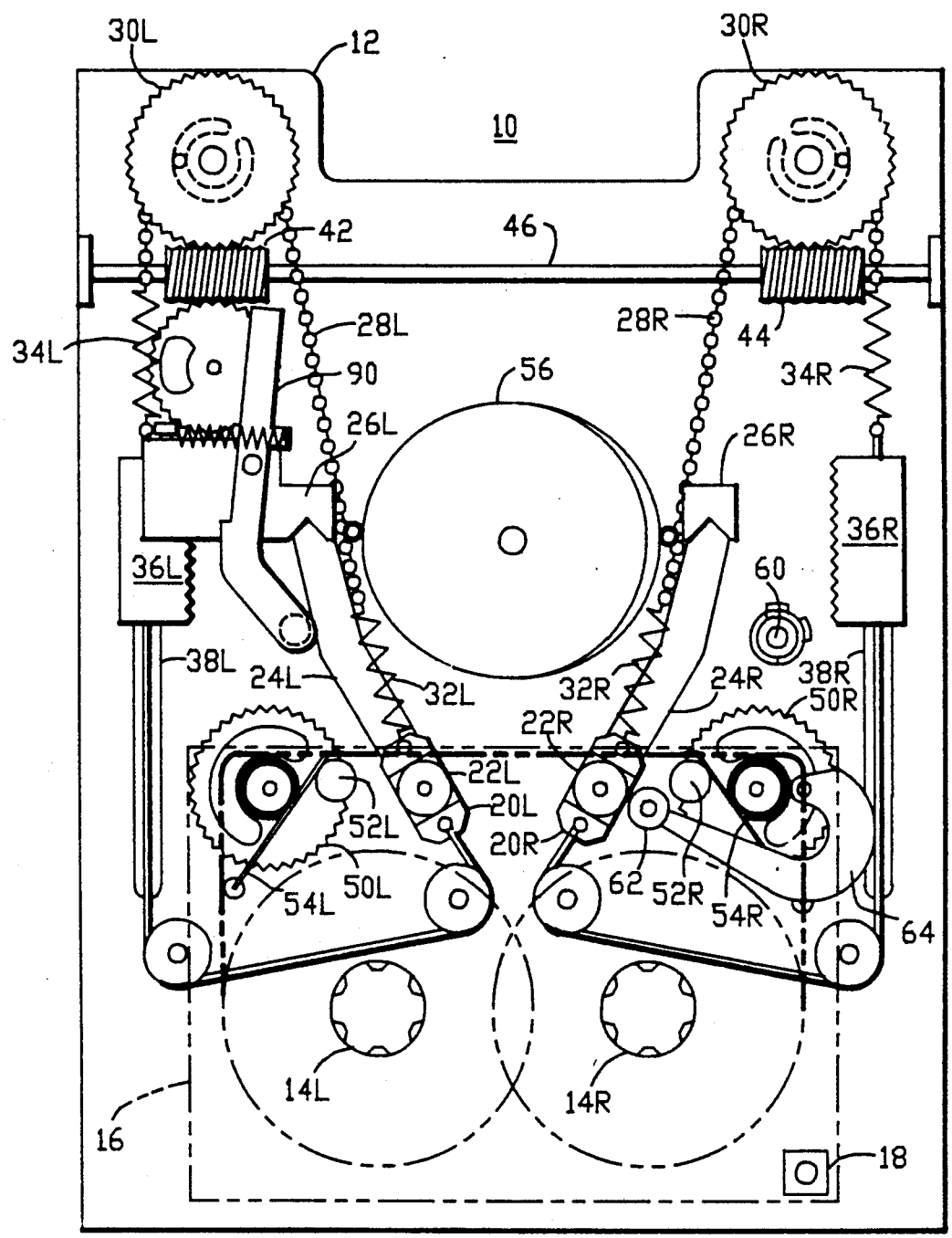
FIG. 1 is a top view of the layout of a presently-preferred embodiment of a tape engagement mechanism according to the present invention shown prior to engagement of the tape around the head drum assembly showing the positions of the elements of the engagement mechanism.
Figure 2:
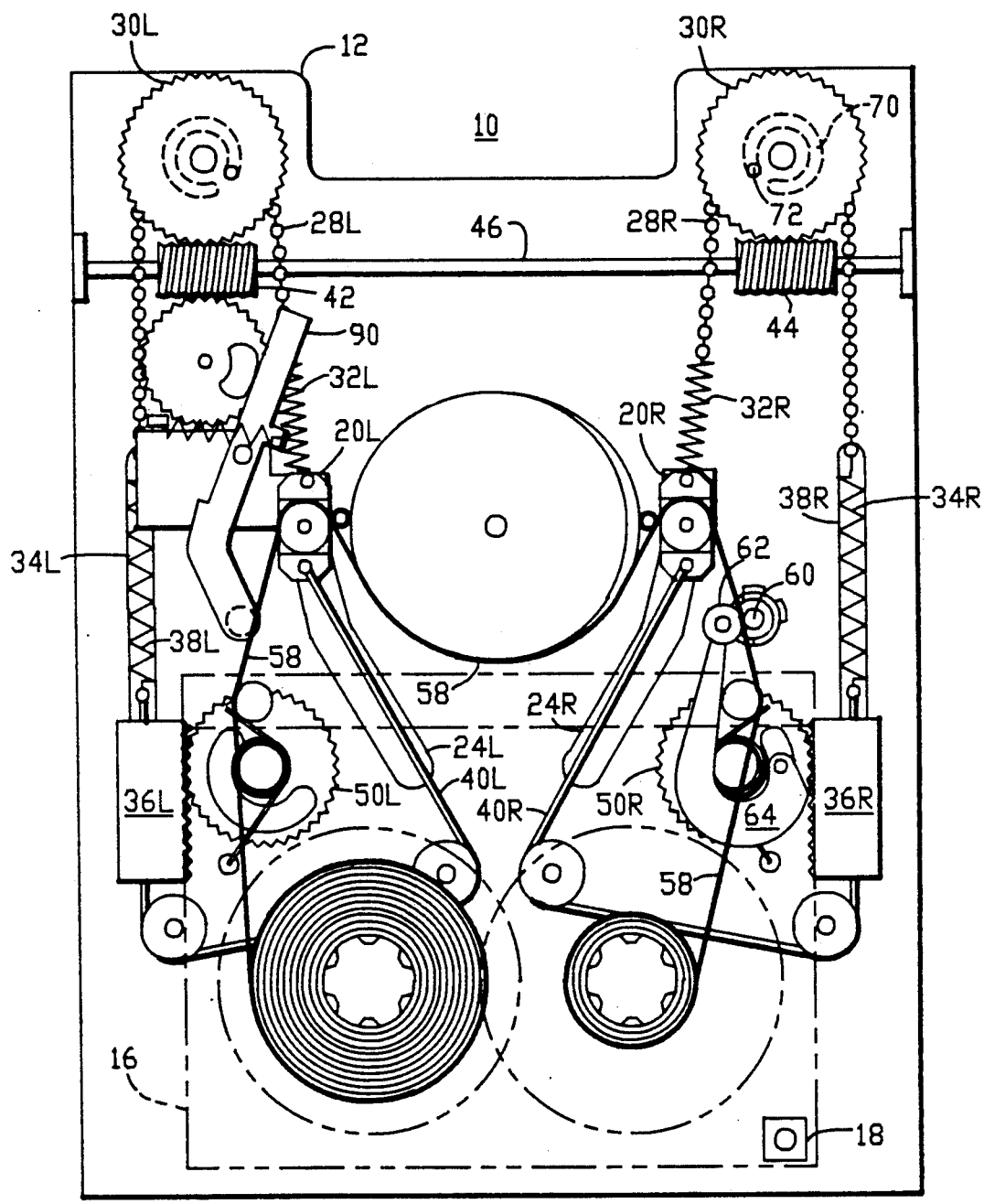
FIG. 2 is a top view of the layout of a presently-preferred embodiment of a tape engagement mechanism according to the present invention shown after engagement of the tape around the head drum assembly, showing the positions of the elements of the engagement mechanism and further showing the position of the tape with respect to the elements of the engaging mechanism.

Referring first to FIGS. 1 and 2, top views of the layout of a presently-preferred embodiment of a tape engagement mechanism according to the present invention, shown prior and subsequent to engagement of the tape around the head drum assembly, respectively, are provided to illustrate the relative engaged and disengaged positions of the elements of the engagement mechanism. Apparatus according to a presently preferred embodiment of the invention extracts a tape from the open door of a cassette when a sensor indicates the presence and correct position of the cassette in the apparatus.

A presently preferred embodiment of a tape insertion and extraction apparatus 10 is mounted on a frame 12. Frame 12 may be fabricated from either metal or plastic or other suitable materials as will be apparent to those of ordinary skill in the art.

Drive spindles 14L and 14R receive the tape cassette (shown in dashed lines denoted by reference numeral 16 to indicate its position in its inserted position) and are driven by a drive motor (not shown). Means are provided for sensing the presence of the tape cassette in a proper position for beginning the process of engagement of the tape in the cassette with the head assembly in the device. In a presently preferred embodiment, a microswitch 18 is used to sense the presence of the cassette in the proper position on drive spindles 14L and 14R.

A symmetrical engagement mechanism according to a presently preferred embodiment includes left and right tape extraction roller blocks 20L and 20R. Vertically-oriented tape extraction roller members 22L and 22R are mounted on the tape extraction roller blocks for engaging the tape from cassette 16.

Left and right tape extraction roller blocks 20L and 20R ride on left and right tape extraction roller block guides 24L and 24R. Left and right tape positioning V-blocks 26L and 26R are positioned at the ends of left and right tape extraction roller block guides 24L and 24R to locate the engaged position of the tape.

In a preferred embodiment, are each coupled to a length of timing belt or bead chain 28L and 28R. Bead chains 28L and 28R engage chain sprocket drivers in worm wheel gears 30L and 30R, respectively, which accept its respective timing belt or bead chain 28L or 28R to provide a non-slip drive means.

Bead chains 28L and 28R are respectively coupled to one end of springs 32L and 32R and 34L and 34R, respectively. The other ends of springs 32L and 32R are coupled to tape extraction roller blocks 20L and 20R. The other ends of springs 34L and 34R are connected to one end of rack gears 36L and 36R, respectively. Rack gears 36L and 36R ride in channels or guides 38L and 38R, respectively. The other ends of springs 32L and 32R are coupled to tape extraction roller blocks 20L and 20R. The other ends of springs 34L and 34R are connected to one end of rack gears 36L and 36R, respectively.

The other end of rack gears 36L and 36R are coupled to one end of a length of cable 40L and 40R. The other end of cables 40L and 40R are coupled to the other end of tape extraction roller blocks 20L and 20R, respectively. Cables 40L and 40R may be lengths of steel cable, such as CF 1452, available from CMA Corporation, of Fairfield, N.J., although those of ordinary skill in the art will recognize that any cable having similar properties may be used.

As can be appreciated by those of ordinary skill in the art, the tension on the driving loops created by bead chains 28L and 28R, springs 32L and 32R, tape extraction roller blocks 20L and 20R, cables 40L and 40R, rack gears 38L and 38R, and springs 34L and 34R, respectively, may be maintained relatively constant by the action of springs 32L, 32R, 34L and 34R. In the engaged rest position (tape extraction roller blocks 20L and 20R in contact with tape positioning V-blocks 26L and 26R), springs 32L and 32R are relatively tensioned, assuring firm contact between tape extraction roller blocks 20L and 20R and tape positioning V-blocks 26L and 26R, and springs 34L and 34R are relatively untensioned. In the unengaged rest position, rack gears 36L and 36R are at the end of their travel at the upper ends of guides 38L and 38R, respectively, and springs 32L and 32R are relatively untensioned while springs 34L and 34R are relatively tensioned.

Worm wheel gears 30L and 30R are configured to be driven in opposite directions by left worm gear 42 and right worm gear 44. Left worm gear 42 and right worm gear 44 are driven from a common shaft 46 by a motor 48 (shown in FIG. 3). In a presently preferred embodiment, worm gears 42 and 44 and worm wheel gears 30L and 30R may provide a large speed reduction, such as about 1500:1, which allows the use of an inexpensive, low torque motor for multiple functions.

Pinion gears 50L and 50R are mounted in the path of travel of rack gears 36L and 36R, respectively, as defined by channels or guides 38L and 38R, so as to be engaged by rack gears 36L and 36R.

Tape entry and exit positioning rollers 52L and 52R are eccentrically mounted on pinion gears 50L and 50R respectively so as to engage the tape contained in cassette 16.

The rest positions of pinion gears when unengaged by rack gears 36L and 36R are established by a spring biased stop. In a presently preferred embodiment, bias spring 54L applies a clockwise torque on pinion gear 50L and bias spring 54R applies a counter-clockwise torque on pinion gear 50R. Unengaged rest positions of pinion gears 36L and 36R may be established, as is known in the art by such means as downwardly projecting tabs on the bottom surfaces of pinion gears 50L and 50R (not shown) engaging upwardly projecting tabs formed in frame 12.

The combination of bead chains 28L and 28R, worm wheel gears 30L and 30R springs 32L and 32R, 34L and 34R, rack gears 36L and 36R and cables 40L and 40R comprise a substantially constant tensioned, non-slip drive means which performs several functions, which may be easily understood in terms of the operation of the engagement mechanism with reference to both FIGS. 1 and 2.

As shown in FIG. 1, in the unengaged rest position of the apparatus of the present invention, tape extraction roller blocks 20L and 20R are located at the lower ends of their guides 24L and 24R. Bead chains 28L and 28R are positioned close to one end of their travel such that springs 34L and 34R are positioned close to worm wheel gears 30L and 30R, respectively. Rack gears 36L and 36R are located at the upper ends of guides 38L and 38R. Springs 32L and 32R are lightly tensioned and springs 34L and 34R are tensioned. Pinion gear 50L is in its clockwise stopped rest position and pinion gear 50R is in its counter-clockwise stopped rest position. As can be seen from FIG. 1, in this position tape entry and exit positioning rollers 52L and 52R are located towards the center of the apparatus, i.e., at the three o'clock and nine o'clock positions, respectively.

When microswitch 18 indicates the presence of a tape cassette, motor 48 is activated and turns shaft 46 and left worm gear 42 and right worm gear 44, connected to shaft 46. This action causes left worm wheel gear 30L to rotate in a counter-clockwise direction and right worm wheel gear 30R to rotate in a clockwise direction.

The motion of left and right worm wheel gears causes their associated non-slip drive means to move. Thus, rack gears 36L and 36R begin to move downward along their guides 38L and 38R, and tape extraction roller blocks 20L and 20R begin to move upward along their guides 24L and 24R.

As the simultaneous motion of these elements progresses, the tape (shown in FIG. 2 at reference numeral 58) is first engaged by tape entry and exit positioning rollers 22L and 22R and is pulled in an upward direction towards head drum assembly 56. In addition, when racks 36L and 36R engage pinion gears 50L and 50R, pinion gear 50L begins to rotate in a counter-clockwise direction and pinion gear 50R begins to rotate in a clockwise direction. At a predetermined position along the rotational path of pinion gears 50L and 50R, tape entry and exit positioning rollers 52L and 52R engage the tape and pull it in generally opposite and outward directions to a final position shown in FIG. 2.

At the end of their travel, tape extraction roller blocks 20L and 20R contact left and right tape positioning V-blocks 26L and 26R which stop their motion and finally position them. As shown in FIG. 2, in the fully engaged position, tape extraction roller blocks 20L and 20R are held against left and right tape positioning V-blocks 26L and 26R by the tension in springs 34L and 34R, respectively. When the upward motion of tape extraction roller blocks 20L and 20R stops, the motion of rack gears 36L and 36R also stops, since they are coupled together by inelastic cables 40L and 40R.

A presently preferred embodiment of the present invention includes a capstan 60, which may be driven by a suitable servo motor as is well known in the art. Tape 58 is engaged and forced against capstan 60 by pinch roller 62, mounted on pinch roller arm 64.

Figure 3:
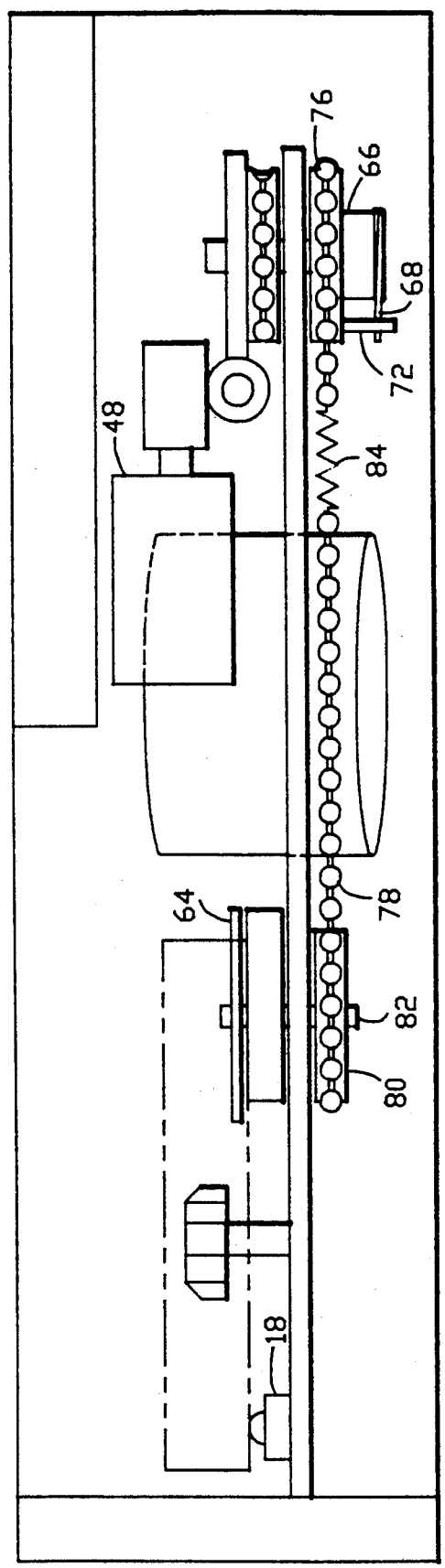
FIG. 3 is a right side view of the engagement mechanism shown in FIGS. 1 and 2, showing the pinch roller arm drive mechanism.
Figure 4A:
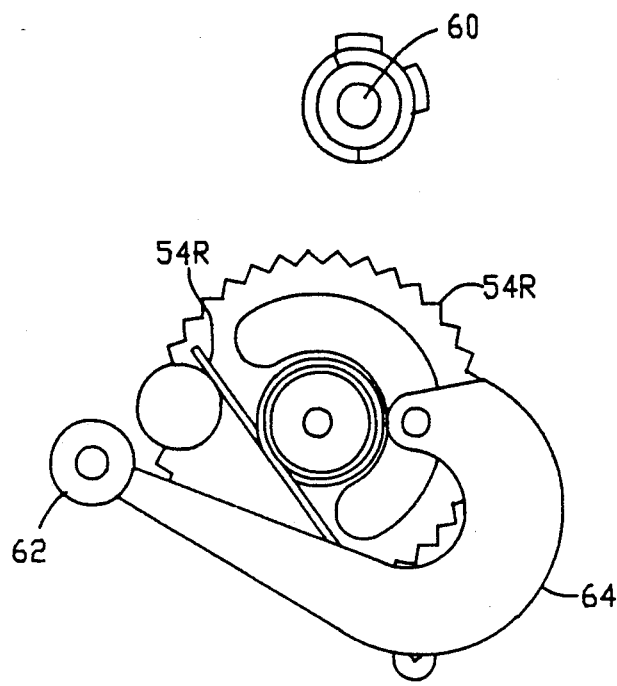
FIG. 4a is a drawing of a section of the engagement apparatus shown in FIGS. 1 and 2, enlarged to show the pinch roller engagement mechanism in greater detail in the unengaged position.
Figure 4B:
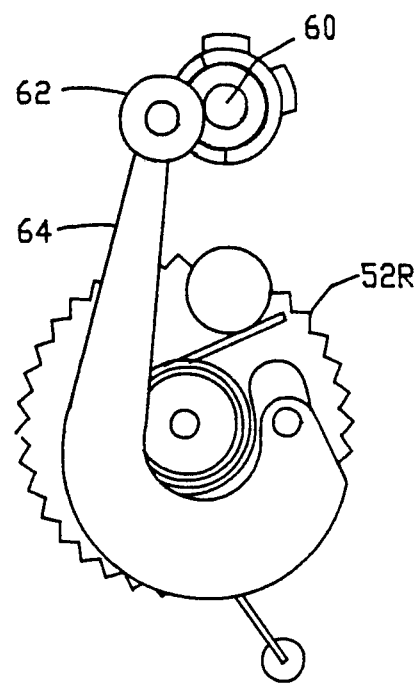
FIG. 4b is a drawing of the same section of the engagement apparatus as shown in FIG. 4a, enlarged to show the pinch roller engagement mechanism in greater detail in the engaged position.

The driving mechanism for pinch roller arm 64 is best understood with reference to FIGS. 3, 4a and 4b. The pinch roller arm driving mechanism may be located on the underside of frame 12 and, in a presently-preferred embodiment, includes a driving wheel 66 mounted on the same shaft as right worm wheel gear 30R in a free wheeling manner and is connected to torsion spring 68 which attempts to maintain it in a home position. Right worm wheel gear 30R has a partially circumferential groove 70 which engages a pin 72 in driving wheel 66. Driving wheel 66 will not move until pin 72 completely traverses groove 70 and engages its edge. The purpose of groove 70 and pin 72 is to provide a fixed delay for the motion of pinch roller arm to allow the tape to reach the proper position before being engaged by the capstan 60.

Driving wheel 66 is sprocketed, as illustrated by reference numeral 76, to accept a driving means such as a timing belt or bead chain 78 which engages sprocketed driven pinch roller arm wheel 80 mounted on a shaft 82 which forms the pivot point for pinch roller arm 64. When sprocketed driven pinch roller arm wheel 80 turns, pinch roller arm 64 moves.

In a presently preferred embodiment, the driving means may be biased with a spring 84 so that when the pinch roller on pinch roller arm 64 traps the tape against capstan 60, driving wheel 66 is allowed to overtravel by a predetermined amount and thus stretch the spring 84, which provides a predictable pinch force.

Those of ordinary skill in the art will recognize that, if desired, the angular displacement of groove 70 may be distributed among driving wheel 66 and pinch roller arm wheel 80 to provide the same delay. In such a case, an engaging pin must be provided on a member associated with pinch roller arm 64.

A presently preferred embodiment of the present invention includes means for preventing jamming of the drive system. In the event that one of tape extraction roller blocks comes into contact with its tape positioning V-block before the other, springs 34L and 34R also act to prevent the end of travel contact from binding the motor rotation and adversely affecting seating of the later arriving tape extraction roller block with its tape positioning V-block.

Figure 5:
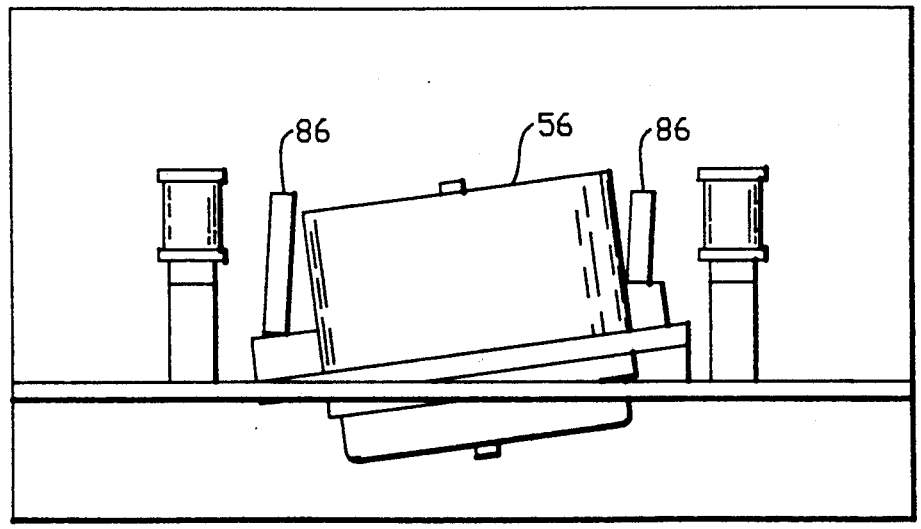
FIG. 5 is a side view of the structure surrounding the head drum assembly, showing the fixed but adjustable angled pins for tape attitude correction.
Figure 6B:
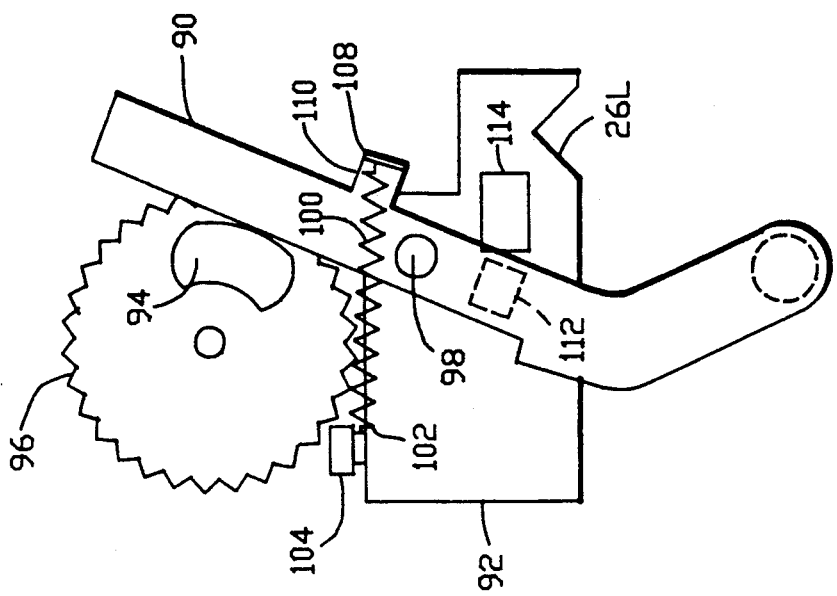
FIG. 6b is a drawing of the same section of the engagement apparatus as shown in FIG. 6a, enlarged to show the tension arm engagement mechanism in greater detail in the engaged position.
Figure 6A:
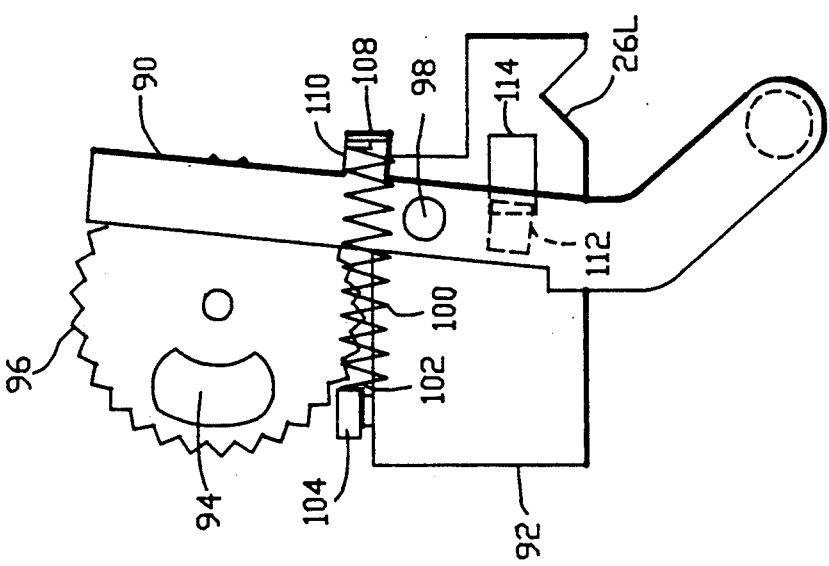
FIG. 6a is a drawing of a section of the engagement apparatus shown in FIGS. 1 and 2, enlarged to show the tension arm engagement mechanism in greater detail in the unengaged position.

In an embodiment where the device includes a helical-scan head drum assembly such as that shown diagrammatically at reference numeral 56, stationary means are provided for correcting the position of the tape 58 from the tilted plane of the helical-scan head drum assembly 56 to the vertical plane. These means engage the tape 58 prior to the end of travel of the tape extraction roller blocks 20L and 20R. As illustrated in FIG. 5, in a presently preferred embodiment, this means consists of a pair of fixed inclined pins 86, which may have their angles adjusted for optimum performance.

As a part of the engaging process performed by a presently preferred embodiment of the apparatus described herein, the tape 58 may also be loaded around a tension arm including a tension sensor. As can be seen from FIGS. 1, 2, 6a, and 6b, tension arm 90 is pivotally mounted on the top of frame 12, preferably on an assembly 92, which includes left tape positioning V-block 26L in a position so as to be engageable by cam member 94, located on cam wheel gear 96. As shown in FIGS. 1 and 2, cam wheel gear 96 may be driven by left worm gear 42, and is positioned such that cam member 94 will act to push tension arm 90 out of the way as the tape is brought into position by tape extraction roller block 20L.

Assembly 92 includes a pivot point 98, upon which tension arm 90 pivots. In a presently preferred embodiment, an "offset over-center" spring 100 is fastened at one of its ends 102 to an adjustment screw 104 located in a tapped hole in assembly 92. Spring 100 is fastened at its other end 108 to a tit 110 protruding at approximately a right angle from the body of tension arm 90 as shown in FIGS. 1 and 2. The offset over-center spring configuration allows a more constant force to be exerted on the tape by tension arm 90 over a wider range of tape tensions and hence angular positions of tape tension arm 90.

A permanent magnet 112 is mounted on tension arm 90 and communicates with Hall effect sensor 114 for providing a feedback signal for adjusting tape tension as is well known in the art.

In a presently preferred embodiment, a velocity transducer, which may include a rubber roller equipped with a magneto-resistive or optical encoder or other equivalent encoder, is mounted in a position which intercepts the engaged tape path. A presently preferred tension sensor may be a spring adjusted arm mounted on the base plate.

Once the mechanism of the present invention has engaged the tape as is shown in FIG. 2, the tape is in a "play" orientation. In order to fast forward or rewind the tape 58, the pinch roller arm 64 and tension arm 90 are moved out of their engaged positions. This is accomplished by reversing the direction of rotation of motor 48 and letting it execute a predetermined number of rotations. This action serves to cause cam member 94, located on cam wheel 96 to move tension arm 90 into a disengaged position. It also causes the pin 72 in driving wheel 66 to revolve towards the open groove 70. Torsion spring 68 causes driving wheel 66 to rotate towards its home position, thus moving pinch roller arm 64 out of its engaged position.

While presently-preferred embodiments of the present invention have been disclosed herein, those of ordinary skill in the art will be enabled, from the within disclosure, to configure embodiments which, although not expressly disclosed herein, nevertheless fall within the scope of the present invention. It is therefore intended that the scope of the present invention be limited only by the appended claims.

What is claimed is:

1. Apparatus for extracting a magnetic tape from a cassette and positioning it proximately to a tape head for playback or recording, including:
   symmetrical first and second tape engagement means for extracting said tape from said cassette and moving it along first and second tape engagement paths in a direction towards said tape head, said first and second tape engagement means including first and second end of travel stop means at either end of said first and second tape engagement paths for halting said first and second tape engagement means at predetermined stop positions, and
   drive means for imparting motion to said tape engagement means, said drive means including anti-jamming means to prevent jamming said drive means in the event that one of said first and second tape engagement means arrives at its predetermined stop position before the other.

2. The apparatus of claim 1 wherein said driving means is a low torque, high speed electric motor coupled to a first and a second timing belt through one or more sprocketed driving gears.

3. The apparatus of claim 2 wherein said anti-jamming means comprises a longitudinal spring at each end of said first and second timing belts coupling said timing belts to drive cables attached to said first and second tape engagement means, respectively.

4. The apparatus of claim 3 further including:
   a capstan positioned proximate to said second tape engagement path,
   a pinch roller, and
   means for engaging said tape by said pinch roller and forcing said tape against said capstan at a predetermined point along said tape engagement path.

5. The apparatus of claim 3 further including tape tension sensing means associated with said tape tensioning means.

6. The apparatus of claim 3 wherein said tape tensioning means includes a tension arm and an offset over-center spring connected between said tension arm and a fixed point.

7. The apparatus of claim 6 wherein said fixed point is adjustable in position so as to vary the amount of force exerted by said spring on said tension arm.

8. The apparatus of claim 1 wherein said driving means is a low torque, high speed electric motor coupled to a first and a second bead chain through one or more sprocketed driving gears.

9. The apparatus of claim 8 wherein said anti-jamming means comprises a longitudinal spring at each end of said first and second timing belts coupling said timing belts to drive cables attached to said first and second tape engagement means, respectively.

10. The apparatus of claim 1 further including tape tensioning means for imparting tension to said tape, and
    means for engaging said tape tensioning means at a predetermined point along said first tape engagement path.

11. The apparatus of claim 1 further including:
    a capstan positioned proximate to said second tape engagement path,
    a pinch roller, and
    means for engaging said tape by said pinch roller and forcing said tape against said capstan at a predetermined point along said second tape engagement path.

12. Apparatus for extracting a magnetic tape from a cassette and positioning it around a helical scan head drum assembly for playback or recording, including:
    symmetrical first and second tape engagement means for extracting said tape from said cassette and moving it along first and second tape engagement paths in a direction towards said tape head, said first and second tape engagement means including first and second end of travel stop means at either end of said first and second tape engagement paths for halting said first and second tape engagement means at predetermined stop positions, and
    drive means for imparting motion to said tape engagement means, said drive means including anti-jamming means to prevent jamming said drive means in the event that one of said first and second tape engagement means arrives at its predetermined stop position before the other.

13. The apparatus of claim 12 wherein said driving means is a low torque, high sped electric motor coupled to a first and a second timing belt through one or more sprocketed driving gears.

14. The apparatus of claim 13 wherein said anti-jamming means comprises a longitudinal spring at each of said first and second timing belts coupling said timing belts to drive cables attached to said first and second tape engagement means, respectively.

15. The apparatus of claim 14 further including:
    a capstan positioned proximate to said second tape engagement path,
    a pinch roller, and
    means for engaging said tape by said pinch roller and forcing said tape against said capstan at a predetermined point along said second tape engagement path.

16. The apparatus of claim 14 further including tape tension sensing means associated with said tape tensioning means.

17. The apparatus of claim 14 wherein said tape tensioning means includes a tension arm and an offset over-center spring connected between said tension arm and a fixed point.

18. The apparatus of claim 17 wherein said fixed point is adjustable in position so as to vary the amount of force exerted by said spring on said tension arm.

19. The apparatus of claim 12 wherein said driving means is a low torque, high speed electric motor coupled to a first and a second bead chain through one or more sprocketed driving gears.

20. The apparatus of claim 19 wherein said anti-jamming means comprises a longitudinal spring at each end of said first and second timing belts coupling said timing belts to drive cables attached to said first and second tape engagement means, respectively.

21. The apparatus of claim 12 further including tape tensioning means for imparting tension to said tape, and
means for engaging said tape tensioning means at a predetermined point along said first tape engagement path.

22. The apparatus of claim 12 further including:
a capstan positioned proximate to said second tape engagement path,
a pinch roller, and
means for engaging said tape by said pinch roller and forcing said tape against said capstan at a predetermined point along said second tape engagement path.

23. The apparatus of claim 12 further including fixed tape attitude correction means for correcting the position of the tape from a tilted plane associated with said helical-scan head drum assembly to the vertical plane, said means engaging said tape prior to its engagement with said helical scan head drum assembly.

24. The apparatus of claim 23 wherein said tape attitude correction means consists of a pair of fixed inclined pins.

25. The apparatus of claim 24 wherein the angle of incline of said pins is adjustable.

* * * * *